US008325954B2

(12) United States Patent
Fischer et al.

(10) Patent No.: US 8,325,954 B2

(45) Date of Patent: Dec. 4, 2012

(54) PROCESSING AN INPUT SIGNAL IN A HEARING AID

(75) Inventors: Eghart Fischer, Schwabach (DE); Matthias Fröhlich, Erlangen (DE); Jens Hain, Kleinsendelbach (DE); Henning Puder, Erlangen (DE); André Steinbuß, Erlangen (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 1273 days.

(21) Appl. No.: 11/973,476

(22) Filed: Oct. 9, 2007

(65) Prior Publication Data

US 2008/0123880 A1 May 29, 2008

(30) Foreign Application Priority Data

Oct. 10, 2006 (DE) ........................ 10 2006 047 983

(51) Int. Cl.

| | |
|---|---|
| *H04R 25/00* | (2006.01) |
| *H04R 3/00* | (2006.01) |
| *H04R 9/08* | (2006.01) |
| *H04R 11/04* | (2006.01) |
| *H04R 17/02* | (2006.01) |
| *H04R 19/04* | (2006.01) |
| *H04R 21/02* | (2006.01) |
| *H04B 15/00* | (2006.01) |

(52) U.S. Cl. .......... 381/313; 381/92; 381/94.1; 381/356

(58) Field of Classification Search ........................ None
See application file for complete search history.

(56) References Cited

U.S. PATENT DOCUMENTS

| | | | | |
|---|---|---|---|---|
| 6,449,216 | B1 * | 9/2002 | Roeck | 367/124 |
| 6,766,029 | B1 * | 7/2004 | Maisano | 381/313 |
| 6,778,674 | B1 * | 8/2004 | Panasik et al. | 381/313 |
| 2004/0175008 | A1 * | 9/2004 | Roeck et al. | 381/312 |
| 2006/0126872 | A1 * | 6/2006 | Allegro-Baumann et al. | 381/312 |

FOREIGN PATENT DOCUMENTS

| | | | |
|---|---|---|---|
| EP | 1 017 253 | A2 | 7/2000 |
| EP | 1463378 | A2 | 9/2004 |
| EP | 1 655 998 | A2 | 5/2006 |
| EP | 1670285 | A2 | 6/2006 |
| WO | 0019770 | A1 | 4/2000 |
| WO | 0187011 | A2 | 11/2001 |

* cited by examiner

*Primary Examiner* — Hoang-Quan Ho

(57) ABSTRACT

Method for processing an input signal in a hearing aid, with the input signal being broken down into a discrete signal for each source relative to an acoustic signal, with the discrete signals being assigned to a spatial position of the source and with the discrete signals being output, or output attenuated, relative to the spatial position.

2 Claims, 4 Drawing Sheets

PROCESSING AN INPUT SIGNAL IN A HEARING AID

CROSS REFERENCE TO RELATED APPLICATIONS

This application claims priority of German application No. 102006047983.1 DE filed Oct. 10, 2006, which is incorporated by reference herein in its entirety.

FIELD OF INVENTION

The invention relates to a method for processing an input signal in a hearing aid and a device for processing an input signal in a hearing aid.

BACKGROUND OF INVENTION

The enormous advances in microelectronics now enable extensive analog and digital signal processing, even in a restricted space. The availability of analog and digital signal processors with minimum spatial dimensions has also paved the way in recent years for their use in hearing aids, clearly an application in which system size is essentially limited.

In the case of hearing aids, a simple amplification of an input signal from a microphone often leads to unsatisfactory results because interference signals are also amplified at the same time and this limits the benefit for the user to special acoustic situations. For several years, digital signal processors that digitally process the signal from one or more microphones have therefore been fitted in hearing aids, so that, for example, selected unwanted noise can be appropriately suppressed.

Modern signal processing methods mainly include a "Blind Source Separation" (BSS), with an input signal from several acoustic sources being broken down into discrete signals. Furthermore, a classification of the input signal is known whereby the actual acoustic situation is classified according to classification variables, such as the input signal level. For example, an input signal can then be broken down into two discrete signals and differentiated by a classification, with the discrete signals being fed, amplified if required, to the user. Furthermore, parameters in the hearing aid, can, for example, be changed so that a directional microphone is activated in order to suppress sound sources from the rear semi-plane.

SUMMARY OF INVENTION

In reality, however, the variety of possible acoustic situations often leads to an inappropriate classification and therefore to a less than optimum setting of the processing parameters. Conventional hearing aids therefore can provide a satisfactory result for the user only in a limited range of acoustic situations and frequently require manual intervention to correct the classification or signal selection. In particularly disadvantageous situations, important sound sources can even remain concealed to the user because they are only output attenuated or not even output at all due to a false selection or classification.

The object of this invention is therefore to provide an improved method for processing an input signal in a hearing aid. It is also the object of this invention to provide an improved device for the processing of an input signal in a hearing aid.

These objects are achieved by via the independent claims. Further advantageous embodiments of the invention are specified in the dependent claims.

According to a first aspect of this invention, a method for processing an input signal in a hearing aid is provided. To do so, the input signal, which is dependent on an acoustic signal, is broken down into a discrete signal for each source and the discrete signals are assigned to a spatial position of the source. The discrete signals are output, or output attenuated, depending on the spatial position.

According to a second aspect of this invention, a device for processing an input signal, which is dependent on an acoustic signal is provided in a hearing aid. The device here has a processing unit which breaks the input signal down into one discrete signal for each source and the discrete signals are assigned to a spatial position of the source. The discrete signals are output by the processing unit or output attenuated, depending on the spatial position.

The input signal in this case can originate from one or more sources and it is therefore possible to selectively output discrete signals or output discrete signals selectively attenuated, depending on the spatial position of the source which is associated with a corresponding portion of the input signal. In the process, selected acoustic signal components from certain sources are transmitted, with acoustic signal components from other sources being selectively attenuated or suppressed. This is conceivable in a number of real life situations in which a suitable transmission or attenuated transmission of discrete signals is advantageous for the user.

In this way, the discrete signals from sources in well defined and limited spatial zones can be provided to the user, with the other sources being attenuated. For example, the discrete signals from sources within a contiguous angular range can be output and the discrete signals from sources outside the contiguous angular range can be output attenuated. Furthermore, the discrete signals from sources within at least two contiguous angular ranges can be output and the discrete signals from sources outside the at least two contiguous angular ranges can be output attenuated. According to this invention, the benefit for the user of a hearing aid can therefore be clearly improved. Furthermore, it can be guaranteed that important signal sources are provided amplified to the user, with interference signals being effectively suppressed.

According to a further embodiment of this invention, the discrete signals are assigned to a defined signal situation and the discrete signals are output, or output attenuated, according to the assigned defined signal situation. For this, at least one of the classification variables such as the number of discrete signals, the level of a discrete signal, the distribution of the level of discrete signals, the power spectrum of a discrete signal, the level of the input signal and/or a spatial position of the source of one of the discrete signals can be determined. The discrete signals can then be assigned to a defined signal situation depending on at least one of the listed classification variables. The defined signal situations can in this case be predetermined, or stored in the hearing aid, or can be modifiable or updatable. The defined signal situations correspond in an advantageous manner to other real life situations that can be characterized or classified according to the aforementioned classification variables or also to other suitable classification variables.

According to a further embodiment of this invention, the assigned, defined signal situation determines the spatial zones in which those sources whose associated discrete signals are output are located, whereas those sources located outside the spatial zones are not transmitted or are transmitted attenuated. In an advantageous manner, the acoustic signals of certain sources can in this way be provided to the user in certain circumstances, whereas the other sources are provided attenuated or essentially faded out. Thus, for example, only sources located frontally are also to the side relative to the user can be output in certain situations.

BRIEF DESCRIPTION OF THE DRAWINGS

Preferred embodiments of this invention are explained in more detail in the following with the aid of the accompanying drawings. The drawings are as follows.

DETAILED DESCRIPTION OF INVENTION

Figure 1:
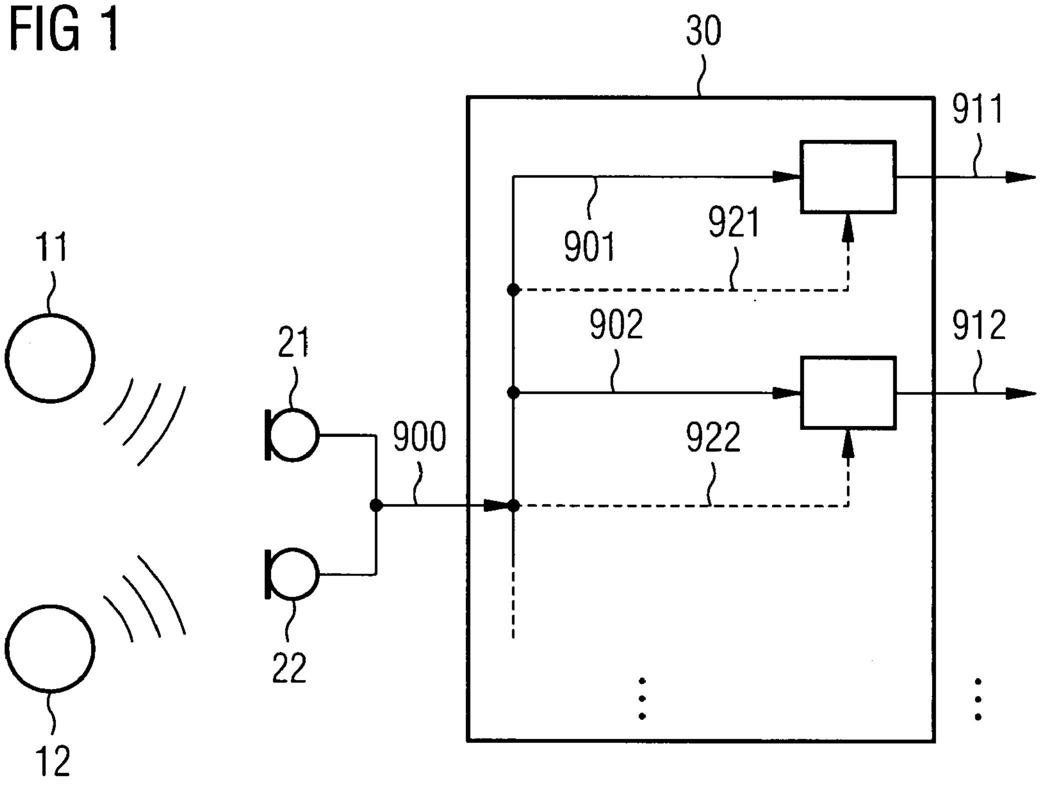
FIG. 1 A schematic representation of a processing unit according to a first embodiment of this invention.

FIG. 1 shows a schematic representation of a processing unit 30 according to a first embodiment of this invention. A first source 11 and a second source 12 generate acoustic signals that are received by a first microphone 21 and a second microphone 22. The first microphone 21 and the second microphone 22 provide an input signal 900 that in addition to the actual sound components also contains information on a spatial arrangement of the particular source 11, 12.

A spatial location of the sources 11, 12 can, for example, take place by a suitable analysis of the input signal, with the input signal, for example, having acoustic signal components of a source from at least two microphones and a corresponding time lag of the signal components being used to determine a spatial position. The information with regard to the spatial arrangement of one of the sources 11, 12 can therefore, for example, be contained therein in that the input signal 900 has two equivalent sound components that are offset by a specific time span. This specific time span is indicated in that the sound from a source 11, 12 generally reaches the first microphone 21 and the second microphone 22 at different time points.

For example, with the arrangement shown in FIG. 1 the sound from the first source 11 reaches the first microphone 21 before the second microphone 22. The spatial distance between the first microphone 21 and the second microphone 22 in this case also influences the specific time span. In modern hearing aids, this distance between the two microphones 21, 22 can be reduced to just a few millimeters, with a reliable source separation still being possible.

A processing unit 30 breaks down the input signal 900 into a first discrete signal 901 and second discrete signal 902 for the first source 11 and the second source 12 respectively. Furthermore, information 921 on a spatial position of the first source 11 and information 922 on a spatial position of the second source 12 is generated. According to this invention, the processing unit 30 outputs the discrete signals 901, 902 as a first output discrete signal 911 or a second output discrete signal 912 or as an attenuated signal, depending on the spatial position of the sources 11, 12. An attenuation in this case can be to the extent that the output of a corresponding discrete signal is essentially suppressed.

The sources 11, 12 in this case can be either directed or diffuse sound signals that transmit the sound either directly or indirectly, for example due to sound reflections from walls. In this case, several sources can also originate from the original source, for example the several reflection sources of a speaker in a partially enclosed room. The input signal 900 in this case is a superpositioning of all acoustic signals that can be received. For this purpose, more than two microphones can, for example, be used to receive the acoustic signals to generate input signal 900.

Figure 2:
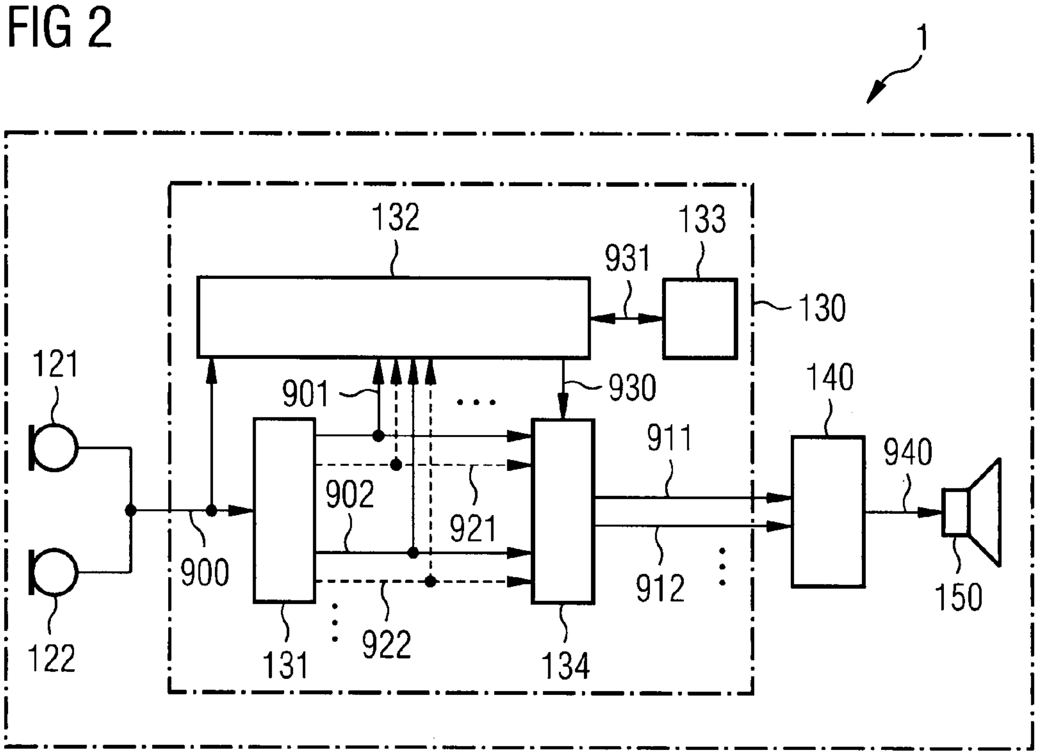
FIG. 2 A schematic representation of a hearing aid according to a second embodiment of this invention.

FIG. 2 shows a schematic representation of a hearing aid 1 according to a second embodiment of this invention. The hearing aid 1 in this case has the first microphone 21, the second microphone 22, a further processing unit 130, an output unit 140 and a loudspeaker 150. The first microphone 21 and the second microphone 22 generate the input signal 900 that is provided to the other processing unit 130 of the hearing aid 1.

The input signal 900 is supplied to a separation unit 131 and an assignment unit 132. The separation unit 131 breaks down the input signal 900 into discrete signals 901, 902 for a source. Furthermore, the separation unit 131 supplies information 921, 922 on the spatial position of the corresponding sources to the discrete signals 901, 902. The information 921, 922 can occur during the separation of the input signal 900 or can also be determined separately by the separation unit 131.

As an option, the discrete signals 901, 902 and/or also the position information 921, 922 can be supplied to the assignment unit 132. A level-setting unit 134 receives a control signal 930 from the assignment unit 132 and generates discrete output signals 911, 912 that are supplied to an output unit 140. The output unit 140 generates an output signal 940 to control the loudspeaker 150. The assignment unit 132 accesses a storage unit 133 by means of a data signal 931.

The separation unit 131 can for example include a BSS (Blind Source Separation) unit for separating the input signal 900 into separate discrete signals in each case for a source. To do so, input signals from several microphones are filtered, taking account of a correlation of the discrete signals. This known method for separating several sources is not described in more detail in this context.

The assignment unit 132 assigns the input signal 900 to a defined signal situation. As an option, discrete signals 901. 902 and/or also position information 921, 922 can also be used for this assignment. The assignment unit 132 can determine at least one of the classification variables, such as the number of discrete signals, the level of a discrete signal, the distribution and level of discrete signals, a power spectrum of a discrete signal, the level of the input signal and the spatial position of the source of a discrete signal. On the basis of at least one of the aforementioned classification variables, the assignment unit 132 can assign the input signal 900 to a defined signal situation. These defined signal situations can be stored in the storage unit 133. In order to determine a similar defined signal situation, a determined classification variable does not necessarily have to be identical to a classification variable of the defined signal situations stored in the storage unit 133, but instead the assignment unit 132, can, for example by the provision of bandwidths and tolerances in the classification variables, assign the most similar of the defined signal situations.

In addition to the classification variables and the corresponding tolerances, a procedure for the output of the discrete signals 901, 902 in a defined signal situation is also stored.

If the assignment unit 132 has therefore assigned the actual acoustic situation of the sources to a defined signal situation, the level-setting unit 134 is accordingly instructed by means of the control signal 930 to output the discrete signals 901, 902 as discrete output signals, or attenuated discrete signals, 911, 912, depending on the defined signal situation that has been determined. For possible signal situations that are meant to be a reflection of situations in daily life and examples of corresponding variables, refer to the table described in conjunction with FIGS. 4 to 6.

Figure 3:
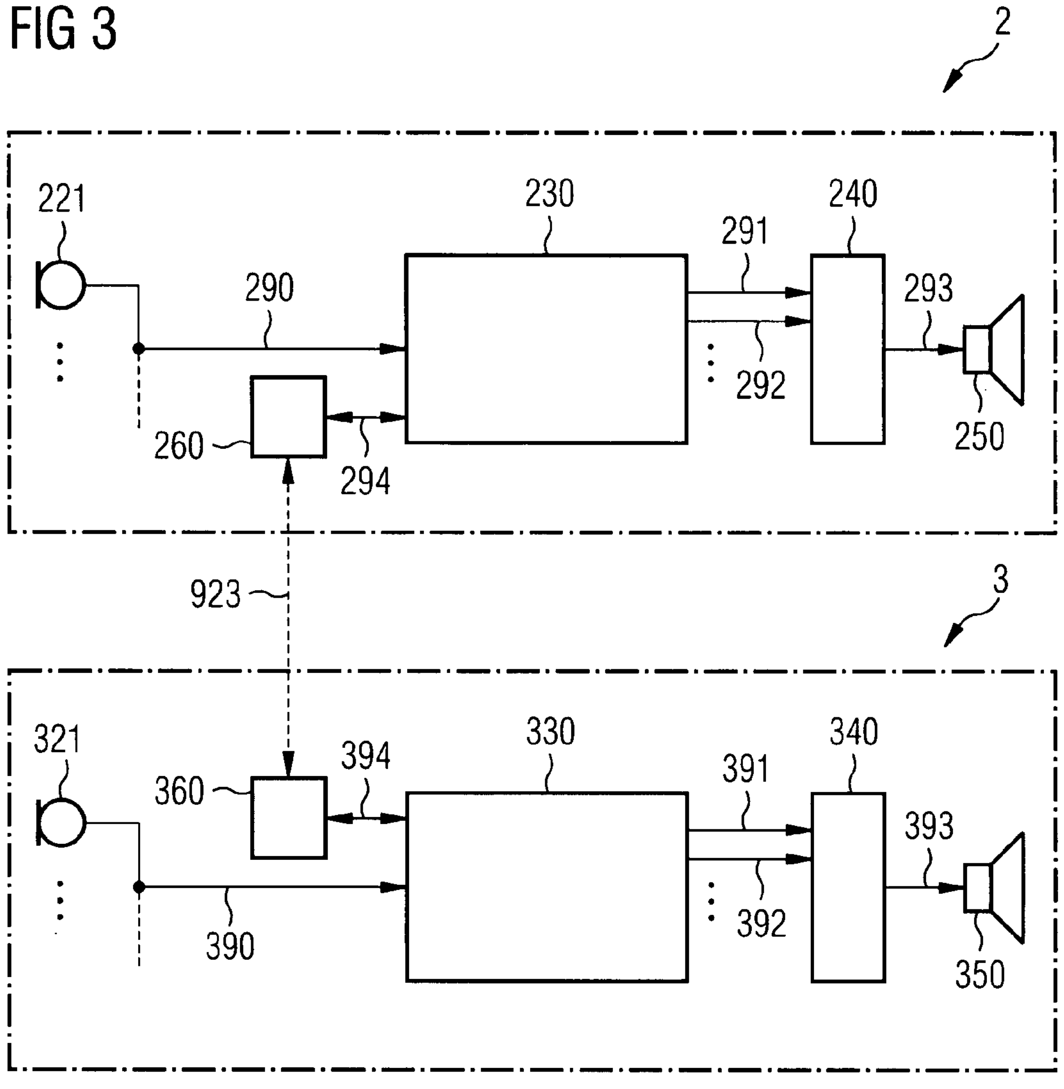
FIG. 3 A schematic representation of a left-side hearing aid and a right-side hearing aid according to a third embodiment of this invention.

FIG. 3 shows a schematic representation of a left-side hearing aid 2 and a right-side hearing aid 3 according to a third embodiment of this invention. The left hearing aid 2 in this case has at least one first left microphone 221, a left processing unit 230, a left output unit 240, a left loudspeaker 250 and a left communication unit 260. The left input signal 290 generated by the at least first left microphone 221 is supplied to the left processing unit 230. According to the invention, the left processing unit 230 outputs a first left discrete signal 291 and a second left discrete signal 292, or attenuated signals, depending on the spatial position of the source of the corresponding discrete signal and, as an option, relative to an assigned defined signal situation. The output unit 240 generates a left output signal 293 that is acoustically output via the left loudspeaker 250. The left processing unit 230 can communicate via a left communication signal 294 with the left communication unit 260 and through this to a further hearing aid.

The right-side hearing aid 3 in this case has at least a first right microphone 321, a right processing unit 330, a right output unit 340, a right loudspeaker 350 and a right communication unit 360. The right input signal 390 generated by the at least first right microphone 321 is supplied to the right processing unit 330. The right processing unit 330 outputs a first right discrete signal 391 and a second right discrete signal 392, or attenuated signals, according to this invention depending on the spatial position of the source of the corresponding discrete signal and, as an option, relative to an assigned defined signal situation. The output unit 340 generates a right output signal 393 which is acoustically output via the right loudspeaker 350. The right processing unit 330 can communicate via a right communication signal 394 with the right communication unit 360 and through this with a further hearing aid.

As shown here, communication between the left-side hearing aid 2 and the right-side hearing aid 2 is provided by means of an external communication signal 923. The external communication signal 923 can be transmitted via a cable connection or also via a wireless radio connection between the left-side hearing aid 2 and the right-side hearing aid 3.

According to this embodiment of the present invention, the left input signal 290 generated by the first left microphone 221, including from the right processing unit 330, can be supplied via the left communication signal 294, the left communication unit 260, the external communication signal 923, the right communication unit 360 and the right communication signal 394. Furthermore, the right input signal 390 generated by the first right microphone 321 can also be supplied to the left processing unit 230 via the right communication signal 394, the right communication unit 360, the external communication signal 923, the left communication unit 260 and the left communication signal 294. In this way, it is possible for a source separation and positioning to be carried out both from the left processing unit 230 and right processing unit 330, even though the left-side and right-side hearing aids 2, 3 can have only a first microphone 221, 321. The increased distance between the first left microphone 221 and the first right microphone 321 compared with a joint arrangement of several microphones in a hearing aid can be favorable and advantageous for the source separation and/or positioning of sources.

Communication between the left processing unit 230 and the right processing unit 330 with respect to a common classification can also be provided through the right communication signal 394, the right communication unit 360, external communication signal 923, left communication unit 260 and left communication signal 294. In this way, it can be guaranteed that both hearing aids 2, 3 assign the actual acoustic situation of the sources to the same defined signal situation and that disadvantageous discrepancies for the user are suppressed.

It can be further provided that the left-side hearing aid 2 and/or the right-side hearing aid have two or more microphones. It can thus be guaranteed that if there is a failure or fault in one of the hearing aids 2, 3 or a failure of the external communication signal 923, reliable functioning is guaranteed, i.e. source separation is still possible for the hearing aid that is still functioning and an assignment of the acoustic situation and position determination of the sources is possible.

It is also possible for the user to intervene both with regards to the classification and to the spatial selection of the discrete signals by means of control elements that can be fitted to the hearing aids 3, 4 or also by means of a remote control. The defined signal situations can thus be advantageously matched, for example during a learning phase, to the requirements and acoustic situations in which the user actually finds himself.

Figure 4:
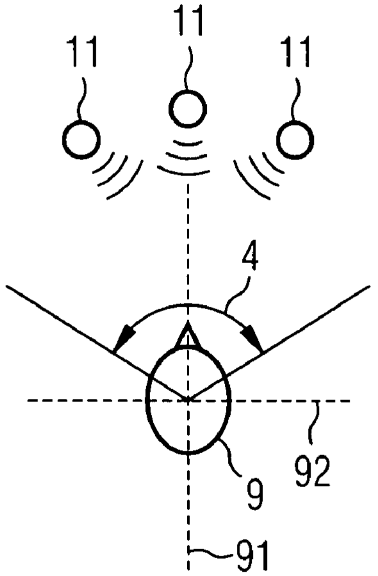
FIG. 4 A schematic representation of an acoustic situation for a user according to a fourth embodiment of this invention.
Figure 5:
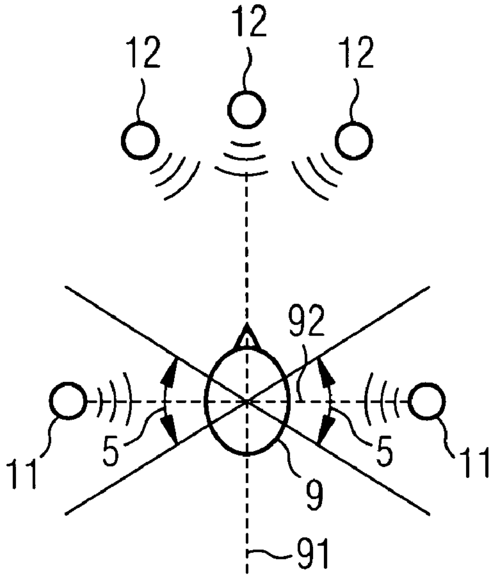
FIG. 5 A schematic representation of an acoustic situation for a user according to a fifth embodiment of this invention.
Figure 6:
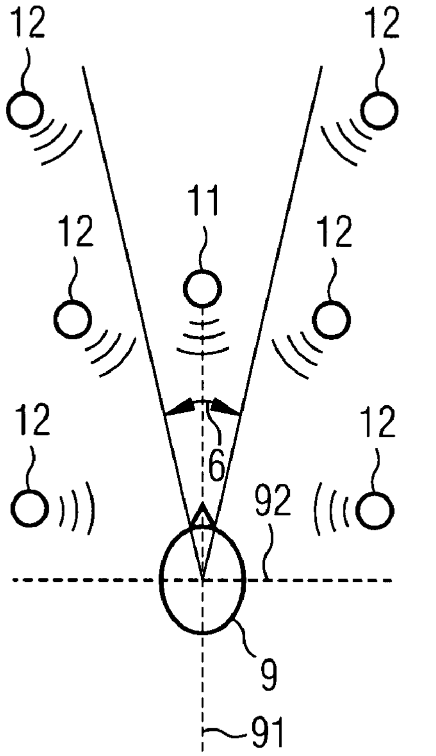
FIG. 6 A schematic representation of an acoustic situation for a user according to a sixth embodiment of this invention.

FIGS. 4, 5 and 6 are schematics of examples of signal situations in which a first source 11 or several first sources 11 and a second source 12 or several second sources 12 can be located and can be sensed by a user 9. In FIGS. 4, 5 and 6, according to a fourth, fifth and sixth embodiment of this invention, the user 9 should be able to sense the first sources 11, whereas the user 9 cannot sense the second sources 12 or can sense them only weakly. A frontal axis 91 is therefore arranged in the frontal direction, i.e. in the line of sight of the user 9. A lateral axis 902 essentially vertical to this is arranged parallel to an axis which runs through both ears of the user 9.

FIG. 4 is a schematic of a signal situation according to a fourth embodiment of this invention. In this case, three first sources 11 are arranged essentially in front of the user 9. These three sound sources 11 can correspond to a signal situation of a quiet conversation. In this case, essentially only a few sound sources occur, i.e. one for each partner in the conversation, with the remaining acoustic background being essentially quiet. This situation can therefore be essentially characterized in that several sound sources of comparable levels are essentially arranged in front of the user 9, whereas noise and interference may be absent or be of only a weak nature. If a corresponding signal situation is detected, then according to the invention a first contiguous angular range 4 can be determined within which all sources that give rise to a discrete signal are provided to the user 9, with other sources being faded out or attenuated.

FIG. 5 shows a schematic of a signal situation according to a fifth embodiment of this invention. This situation can, for example, correspond to a drive in a motor vehicle. In this case no locatable sources essentially occur because only a diffuse acoustic background, for example a noise, occurs. Reflections from the walls of the vehicle interior can impede location. An engine noise can also have a characteristic performance spectrum that causes an assignment to a corresponding defined signal situation. For this acoustic signal situation, it can be arranged that only sources within two contiguous second angular ranges 5 are provided to the user. This can, for example, be expedient in that the user 9 becomes immediately aware of an overtaking vehicle or is aware of a passenger or driver and can follow a conversation with same.

FIG. 6 shows a schematic representation of a signal situation according to a sixth embodiment of this invention. This signal situation can, for example, correspond to a cocktail party where several sources at different positions are arranged over a large room area. In this case, it can be useful if only the first source 11 within a narrower third contiguous angular range 6 in a frontal direction is provided to the user 9. In this case, it can be assumed that the user 9 is only listening to the person opposite, for example listening by observing the lips and face of the respective partner in conversation. The remaining second sources 12 can be provided to the user as before in an attenuated form, so that their acoustic existence is not concealed from the user 9. If the user 9 wants to follow a second source 12, it can also be assumed that he then turns towards this second source 12 and the frontal axis 91, around which the third contiguous angular area 6 is arranged, is accordingly directed.

The following table shows possible signal situations, their classification variables and a corresponding procedure for selecting the discrete signals that are output or output attenuated.

| Situation | Classification variables | Selection |
|---|---|---|
| Quiet conversation (FIG. 4) | Few signal sources<br>Few strong sources<br>Few weak sources<br>Weak sources with low level | Output those sources which are essentially arranged in a frontal direction<br>Output other sources only attenuated |
| Conversation in motor vehicle (FIG. 5) | Many sources (due to reflections in the vehicle)<br>Sources with a characteristic performance spectrum (engine) | Output those source which are arranged essentially in a lateral direction<br>Output remaining sources only attenuated |
| Cocktail party (FIG. 6) | Many signal sources<br>High level<br>High total level | Output only those sources that are arranged in a frontal direction<br>Output remaining sources only attenuated |

Strong sources can in this case be distinguished from weak sources, for example by means of their respective levels. The level of a source in this case is the averaged amplitude level of the corresponding acoustic signal, with a high averaged amplitude level corresponding to a high level and a low averaged amplitude level corresponding to a low level. A strong source in this case can have an averaged amplitude level that is at least double that from a weak source. Further, it can also be provided for an amplitude level increased by 30% compared to a weak source to be assigned to a strong source. The level of the source is amplified or attenuated in that the corresponding discrete signal is amplified or attenuated. A substantial amplification or attenuation of a source level can, for example, be achieved by increasing or reducing the corresponding averaged amplitude level by at least 20%.

The invention claimed is:

1. A device for processing in a hearing aid, for processing input signals, relative to acoustic signals from a plurality of acoustic sources, the device comprising:

a processing unit that:

breaks the input signals into respective discrete signals for each source, assigns the respective discrete signals to respective spatial positions of the sources, and outputs the discrete signals relative to the spatial positions or outputs attenuated discrete signals relative to the spatial positions, such that the processing unit:

outputs the discrete signals of first acoustic sources with spatial positions within a contiguous angular range, and outputs attenuated discrete signals of second acoustic sources with spatial positions outside the contiguous angular range, or outputs the discrete signals of first acoustic sources with spatial positions within two contiguous angular ranges, and outputs attenuated discrete signals of second acoustic sources with spatial positions outside the two contiguous angular ranges, wherein the processing unit comprises an assignment unit that assigns the input signals to a defined signal situation, and wherein the processing unit sets an angular range limit based on the assigned defined signal situation.

2. The device as claimed in claim 1, wherein the assignment unit performs an assignment of the input signals to a defined signal situation based on at least one of a number of classification variables selected from the group consisting of number of discrete signals, level of a discrete signal, distribution of the levels of discrete signals, performance spectrum of a discrete signal, level of the input signals, performance spectrum of the input signals, and spatial position of the source of one of the discrete signals.

* * * * *